J. REBOURS.
CONVERTIBLE VEHICLE BODY.
APPLICATION FILED MAR. 10, 1919.
1,358,784.
Patented Nov. 16, 1920.
2 SHEETS—SHEET 2.
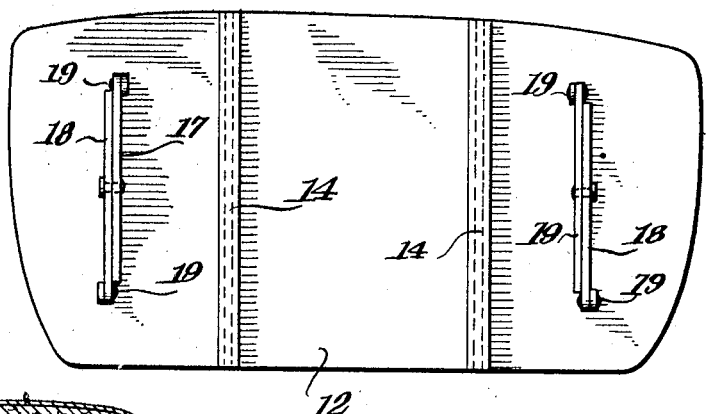
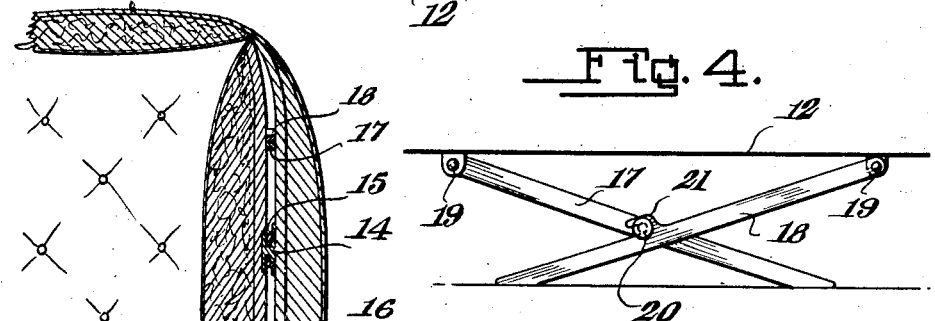
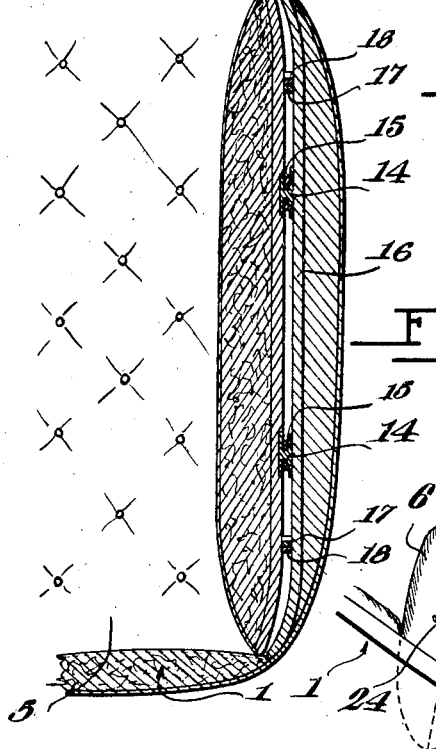
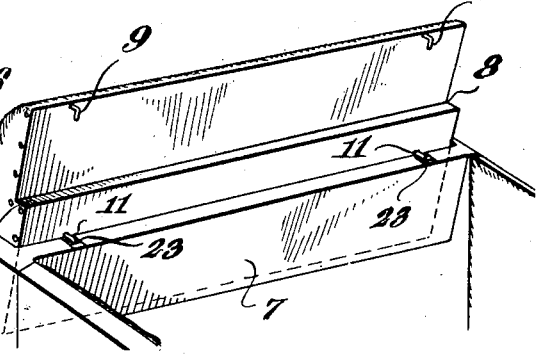
Jules Rebours Inventor
By Lancaster and Allwine
his Attorneys.

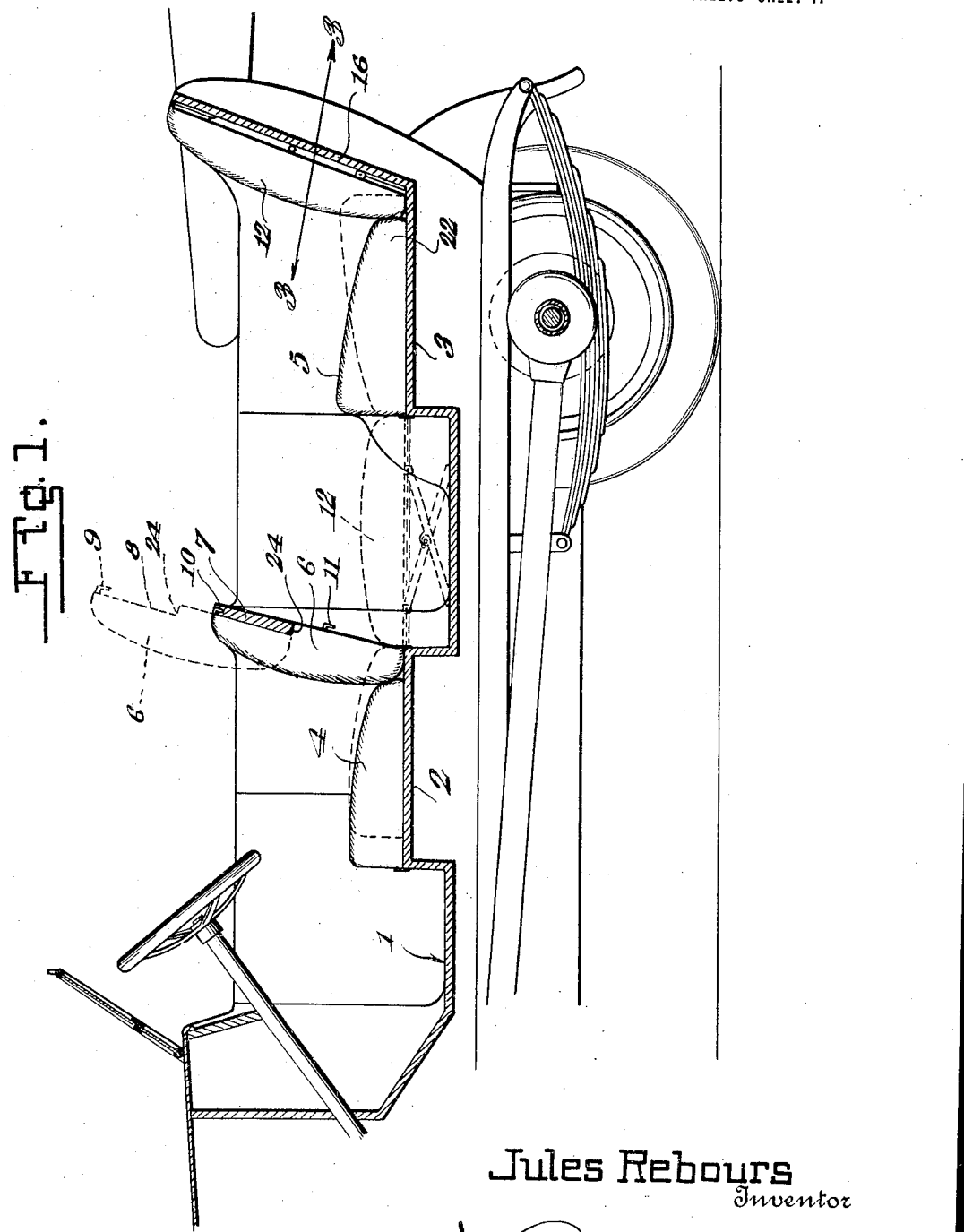

UNITED STATES PATENT OFFICE.

JULES REBOURS, OF GRAND RAPIDS, MICHIGAN.

CONVERTIBLE VEHICLE-BODY.

1,358,784.    Specification of Letters Patent.    Patented Nov. 16, 1920.

Application filed March 10, 1919. Serial No. 281,710.

*To all whom it may concern:*

Be it known that I, JULES REBOURS, a citizen of the United States, residing at Grand Rapids, in the county of Kent and State of Michigan, have invented certain new and useful Improvements in Convertible Vehicle-Bodies, of which the following is a specification.

This invention relates to vehicle bodies, and more specifically to a body wherein the seat structures are movable for converting them from seats into a bed structure, whereby the vehicle may be used for sleeping purposes during touring or when camping out.

An object of this invention is to provide a convertible vehicle body which is comparatively simple in construction and which can be easily and quickly converted from the ordinary seat structure into the bed structure, the back cushion of the rear seats being used in connection with the seat cushions of the front and rear seats for forming the bed structure, while the back of the front seat is elevated to prevent it from obstructing the bed structure.

Another object of the invention is to provide, in a convertible vehicle body as specified a structure for connecting the back of the rear seat to the body of the vehicle, in such manner that the said back may be easily removed for placing between the seat portions of the front and rear seats of the vehicle or so that it may be removed entirely from the vehicle body for use as a seat when placed upon the ground, it having a plurality of supporting legs pivotally connected thereto, which, when the seat back is used for its ordinary function are folded to lie against the rear surface of the seat back, said legs being unfolded to form supports for the seat back when it is used as a seat upon the ground or as a portion of the bed structure.

Other objects of the invention will appear in the following detailed description taken in connection with the accompanying drawings forming a part of this specification and in which drawings:

Figure 1 is a longitudinal section through a vehicle body constructed in accordance with this invention.

Fig. 2 is a rear view of the back of the rear seat of the vehicle.

Fig. 3 is a horizontal section on the line 3—3 of Fig. 1.

Fig. 4 is a detailed view of the supporting legs of the back of the rear seat structure in an extended or operative position, and Fig. 5 is a detail perspective view of the back of the front seat of the vehicle, illustrating the same in a raised position.

Fig. 6 is a detail section through the rigid supporting bar of the back of the front seat.

Referring more particularly to the drawings, wherein like characters indicate like and corresponding parts throughout the several views, 1 indicates the body of the vehicle which is constructed in the ordinary manner, being provided with a front seat supporting portion 2 and a rear seat supporting portion 3, for supporting the seat cushions 4 and 5 of the front and rear seat sections at the proper elevations.

The back 6 of the front seat structure is supported in its usual or ordinary position by a bar 7 which extends laterally across the interior of the body 1, at the top thereof, the said bar being rigidly attached to the sides of the body and having its lower edge positioned a considerable distance above the upper surface of the seat cushions 4 of the front seat. The back 6 is provided with a cut-out portion 8 in its rear side at its upper portion, which normally receives the bar 7 and suitable hooks 9 are carried by the rear surface of the back 6 at its upper edge for engagement with the opening 10 formed in the upper edge of the bar 7 to support the seat back in proper position. When the body is converted to form a bed, the back 6 is elevated to the position as shown in dotted lines in Fig. 1 of the drawings, at which time the hooks 11 carried by the rear surface of the back 6 engage in the opening 10 to support the said seat back in an elevated position, so that its lower edge will be above the upper surface of the seat cushions 4 a sufficient distance to permit a person to lie upon the cushions when they are arranged to form a bed structure. The front 12 of the rear seat structure is detachably connected to the body structure by means of T rails 14 which engage in guides 15 carried by the portion 16 of the body 1 which normally supports the seat back 12. These rails 14 and guides 15 extend vertically, so that the seat back 12 by vertical movement may be disconnected from the portion 16 of the body and move into the dotted line position shown in Fig. 1 of the drawings for coaction with the seat cushions 4 and 5 to form a bed structure. The seat back 12 has a plurality of supporting legs pivotally connected thereto, which supporting legs are arranged in pairs, each pair comprising a leg 17 and 18. These legs 17 and 18 are pivotally connected as shown at 19 to the back of the seat back 12 and the legs 17 carry headed pins 20 which engage in notches 21 formed on the legs 18 for supporting the legs 17 and 18 in crossed extended position for supporting the seat back 12 at an elevation so that its upper surface will be substantially flush with the upper surfaces of the seat cushions 4 and 5. When the cushions are arranged to form a bed structure, the seat cushion 5 of the rear structure is reversed from its normal position so that its low edge 22 will engage the rear edge of the seat back 12 as shown in dotted lines in Fig. 1 of the drawings, for supporting a person's head at an elevation.

If it is so desired, the seat back 12 may be removed from the vehicle body, and placed upon the ground with its supporting legs 17 and 18 extended, to provide a seat or support for any suitable articles.

The pin 10 fits in the sockets 23 in the rigid supporting bar 7, in such manner that when the seat back 6 is in its normal position, the downturned portion of the pins will engage the forward side of the socket to prevent tilting of the seat back by rearward pressure against the lower portion thereof. However, the sockets 23 are of sufficient size to permit the canting of the pin therein when it is desired to elevate the seat back 6 as shown in dotted lines in Fig. 1 of the drawings, and also as indicated in Fig. 6 of the drawings, when converting the vehicle body into a sleeping device.

When it is desired to convert the seat structures into a bed, the cushion 4 of the front seat structure is first moved forwardly and the seat back 6 is rocked or tilted, moving its rear end forwardly enough to allow the shoulder 24 formed by the recess 8 to clear the lower edge of the rigid supporting bar 7, after which the seat back 6 is moved upwardly and positioned so that the hook 11 will engage in the socket 23, for supporting the seat back 6 in its elevated position. After the seat back 6 has been properly elevated, the seat cushion 4 is moved rearwardly, or if it is desired, it may be maintained in its forward position until the back 12 of the rear seat structure has been removed or disconnected from the portion 16 of the body 1, and after the back 12 has its supporting legs extended it is placed between the front and rear seats as shown in dotted lines in Fig. 1 of the drawings, after which the front seat cushion 4 may be moved rearwardly until its rear edge engages the front edge of the back. The cushion 5 of the rear seat structure is then reversed so that its low edge 22 will be positioned forwardly and engage the rear edge of the back 12, thereby providing a bed in which the person's head will be elevated slightly, owing to the angled or inclined condition of the upper surface of the seat cushion 5.

Changes in details may be made without departing from the spirit of this invention, but;

I claim:

1. In a convertible vehicle body, the combination with a body, a front seat structure including a vertically movable back, of a supporting bar rigidly connected to the body and extending across the same, the upper portion of the rear of said movable back engaging said bar.

2. In a convertible vehicle body, the combination with a body, a front seat structure including a vertically movable back, of a flat supporting bar rigidly connected to the vehicle body and extending across the same, the upper portion of the rear of said movable back engaging said bar, and means connecting the movable back to the bar to prevent accidental movement of the back.

3. In a convertible vehicle body, the combination with a body, a front seat structure including a movable back, of a supporting bar rigidly connected to the body and extending across the same, the upper portion of the rear of said movable back engaging said bar, said bar provided with sockets, and means carried by said movable back for engagement with said sockets to prevent accidental movement of the movable back.

4. In a convertible vehicle body, the combination with a body, a front seat structure including a movable back, of a supporting bar rigidly connected to the body and extending across the same, the upper portion of the rear of said movable back engaging said bar, said bar provided with sockets, and means carried by said movable back for engagement with said sockets to prevent accidental movement of the movable back, means carried by said movable back for engagement in said sockets to hold the movable back in a raised position.

5. In a convertible vehicle body, the combination with a body having sides and a front seat structure including a vertically movable back, of a flat supporting bar rigidly connected to the sides of the vehicle body and extending across the same, said movable back provided with a recess in the upper portion of its rear side, adapted to receive said bar therein.

6. In a convertible vehicle body, the combination with a body having sides and a front seat structure including a movable back, of a supporting bar rigidly connected to the sides of the vehicle body and extending across the same, said movable back provided with a recess in the upper portion of its rear sides adapted to receive said bar therein, means carried by the upper edge of said movable back for engaging said bar to prevent accidental movement of the movable back, and means carried by the rear of said movable back below said recess and adapted to engage said bar to support said movable back in a raised position.

7. In a convertible vehicle body, the combination with a body, a front seat structure including a movable back, of a supporting bar connected to the vehicle body and extending across the same, said movable back provided with a recess in the upper portion of its rear side adapted to receive said bar therein, said bar provided with sockets, hooks carried by the upper edge of said movable back and adapted to engage in said sockets to prevent accidental movement of the movable back.

8. In a convertible vehicle body, the combination with a body having sides and a front seat structure including a movable back, of a supporting bar rigidly connected to the sides of the vehicle body and extending across the same, said movable back provided with a recess in the upper portion of its rear side adapted to receive said bar therein, said bar provided with sockets, hooks carried by the upper edge of said movable back and adapted to engage in said sockets to prevent accidental movement of the movable back, hooks carried by the rear of said movable back below said recess and adapted to engage in said sockets to support the movable back in a raised position.

9. In a convertible vehicle body, the combination with a body, of front and rear seat structures including movable backs, a supporting bar rigidly attached to the body, means carried by the movable back at the front seat structure adapted to engage the supporting bar and maintain said movable back in an elevated position, and means for supporting the movable back of the rear seat in substantially horizontal alinement with and intermediate the seat portions of the front and rear seat structures.

10. In a convertible vehicle body, the combination with a body, of front and rear seat structures including movable backs, means for supporting the movable back of the front seat structure in a raised position, guides carried by said body, T bars carried by the back of said rear seat structure and engaging in said guides to detachably connect the back of the rear seat structure to said body.

11. In a convertible vehicle body, the combination with a body, of front and rear seat structures including movable backs, means for supporting the movable back of the front seat structure in a raised position, a plurality of supporting legs pivotally connected to the rear of the back of the rear seat structure, said legs adapted to be unfolded and connected for supporting the back of the rear seat structure in a horizontal position between the seat portions of the front and rear seats.

12. In a convertible vehicle body, the combination with a body, of front and rear seat structures, said rear seat structure including a movable back, guides carried by the body, T-bars carried by said movable back and engaging in said guides to detachably connect the movable back and said body, supporting legs pivotally connected to the rear of said movable back and normally lying in folded position, said supporting legs adapted to be unfolded to support the movable back in a horizontal position forwardly of the seat portion of the rear seat structure.

13. In a convertible vehicle body, the combination, with a body, of front and rear seat structures, including movable backs, a supporting bar rigidly connected to the sides of the body and extending across the body, the upper portion of the rear of the movable back of said front seat structure engaging said bar, means for connecting said movable bar to said back to prevent accidental movement thereof, and means for supporting the movable back of the rear seat structure in a horizontal position between the seat portions of the front and rear seats.

14. In a convertible vehicle body, the combination with a body, of front and rear seat structures including movable backs, a supporting bar rigidly connected to the sides of the body and extending across the same, said bar provided with sockets, means carried by said movable back for engagement in said sockets to prevent accidental movement of the movable back of the front seat structure, means carried by the movable back and the front seat structure for engagement in said socket to support the movable back in a raised position, and means for supporting the movable back of the rear seat structure in a horizontal position between the seat portions of the front and rear seat structure.

15. In a convertible vehicle body, the combination with a body, of front and rear seat structures including movable backs, a supporting bar rigidly connected to the sides of the vehicle body and extending across the body, means for connecting the movable back of the front seat structure to said bar to prevent accidental movement of the movable back, means carried by the movable back of the front seat structure for connection with said bar to support the said movable back in a raised position, means for detachably connecting the movable back of the rear seat structure to said body, legs pivotally connected to the rear of the back of the rear seat structure and normally lying in folded position, said legs adapted to be unfolded to support the back of the rear seat structure in a horizontal position between the seat portions of the front and rear seat structures.

16. In a convertible vehicle body, the combination with a body, a front seat structure including a vertically movable back, a supporting bar rigidly connected to the body and extending across the same, and hooks connecting the movable back to said bar to prevent accidental movement of the back.

17. In a convertible vehicle body, the combination with a body and a front seat structure including a movable back, of a supporting bar connected to the body and extending across the same, means carried by the upper edge of the movable back for engaging said bar to prevent accidental movement thereof, and means carried by the movable back below said first-named means and adapted to engage said bar to support said movable back in a raised position.

JULES REBOURS.